(12) United States Patent
Woodruff et al.

(10) Patent No.: US 8,392,434 B1
(45) Date of Patent: Mar. 5, 2013

(54) RANDOM SAMPLING FROM DISTRIBUTED STREAMS

(75) Inventors: David P. Woodruff, Mountain View, CA (US); Srikanta N. Tirthapura, Ames, IA (US)

(73) Assignees: International Business Machines Corporation, Armonk, NY (US); Iowa State University, Ames, IA (US)

( * ) Notice: Subject to any disclaimer, the term of this patent is extended or adjusted under 35 U.S.C. 154(b) by 0 days.

(21) Appl. No.: 13/234,420

(22) Filed: Sep. 16, 2011

(51) Int. Cl.
  *G06F 17/30* (2006.01)
(52) U.S. Cl. ...................................................... 707/748
(58) Field of Classification Search .................. 707/748, 707/999.101
  See application file for complete search history.

(56) References Cited

U.S. PATENT DOCUMENTS

| | | | | |
|---|---|---|---|---|
| 7,069,264 | B2 * | 6/2006 | Anjur et al. | 1/1 |
| 7,308,447 | B2 * | 12/2007 | Chickering et al. | 1/1 |
| 7,493,406 | B2 | 2/2009 | Amini et al. | |
| 7,796,517 | B2 | 9/2010 | Chen et al. | |
| 7,958,108 | B2 | 6/2011 | Nishizawa et al. | |

FOREIGN PATENT DOCUMENTS

| | | |
|---|---|---|
| CN | 101163058 | 4/2008 |
| KR | 20080109707 | 12/2008 |

OTHER PUBLICATIONS

Srikanta Tirthapura and David P. Woodruff, "Optimal Random Sampling from Distributed Streams Revisted", Distributed Computing, Lecture Notes in Computer Science, vol. 6950, pp. 283-297, 2011.*

Das, K., et al., "Distributed Identification of Top-I Inner Product Elements and Its Application in a Peer-to-Peer Network", IEEE Transactions on Knowledge and Data Engineering, Apr. 2008, pp. 475-486, vol. 20, IEEE Computer Society Press, Los Alamitos, California, USA.

Raisanen, V., et al., "Network performance measurement with periodic streams (RFC3432)", Technical Disclosure, Nov. 1, 2002, 25 pages, IP.com, Inc., Amherst, New York, USA.

Cohen, E., et al., "Stream sampling for variance-optimal of subset sums", Society for Industrial and Applied Mathematics Proceedings of 12th Annual ACM-SIAM Symposium on Discrete Algorithms, Jan. 4-6, 2009, 11 pages, New York, New York, USA.

Alexopoulos, Christos et al., "Sensitivity Analysis in Stochastic Flow Networks Using the Monte Carlo Method." Netowrks, 1993, pp. 605-621, vol. 23, John Wiley & Sons, Inc., Hoboken, New Jersey, USA.

Aggarwal, Charu C., "On Blased Reservoir Sampling in the Presence of Stream Evolution," VLDB '08, Seoul, Korea, Sep. 12-15, 2006, pp. 607-618, ACM Digital Library.

Arackaparambil, Chrisil et al., "Functional Monitoring without Monotonicity," ICALP (Part 1), 2009, pp. 95-106, Springer-Verlag, Berlin, Germany.

(Continued)

*Primary Examiner* — Cheryl Lewis
(74) *Attorney, Agent, or Firm* — Ference & Associates LLC (57) ABSTRACT

Described herein are methods, systems, apparatuses and products for random sampling from distributed streams. An aspect provides a method for distributed sampling on a network with a plurality of sites and a coordinator, including: receiving at the coordinator a data element from a site of the plurality of sites, said data element having a weight randomly associated therewith deemed reportable by comparison at the site to a locally stored global value; comparing the weight of the data element received with a global value stored at the coordinator; and performing one of: updating the global value stored at the coordinator to the weight of the data element received; and communicating the global value stored at the coordinator back to the site of the plurality of sites. Other embodiments are disclosed.

20 Claims, 6 Drawing Sheets

OTHER PUBLICATIONS

Babcock, Brian et al., "Sampling From a Moving Window Streaming Data," SODA, 2002, pp. 633-634, Copy available at http://ilpubs.stanford.edu:8090/503/1/2001-33.pdf as of Sep. 27, 2012.

Braverman, Vladimir et al., "Optimal Sampling from Sliding Windows," PODS '09, Providence, Rhode Island, USA, Jun. 29-Jul. 2, 2009. pp. 147-156, ACM Digital Library.

Cormode, Graham et al., "Sketching Streams Through the Net: Distributed Approximate Query Tracking." Proceedings of the 31st VLDB Conference, Trondheim, Norway, 2005. pp. 13-24, Very Large Data Base Endowment, IBM Aimaden Research Center, San Jose, California, USA.

Cormode, Graham et al., "Algorithms for Distributed Functional Monitoring," SODA, 2008, pp. 1078-1085. Copy available at http://www.cs.ust.hk/~yike/soda08.pdf as of Sep. 27, 2012.

Cormode, Graham et al., "Optimal Sampling From Distributed Streams," PODS '10, Indianapolis, Indiana, USA, Jun. 6-11, 2010, pp. 77-86, ACM Digital Library.

Dash, Manoranjan, "Efficient Reservoir Sampling for Transactional Data Streams," Sixth IEEE International Conference on Data Mining, Dec. 2006, pp. 662-666, IEEE Computer Society, Washington, DC, USA.

Gibbons, Phillip, B. et al., "Estimating Simple Functions on the Union of Data Streams,"SPAA '01, Crete, Greece, 2001, pp. 261-290, ACM Digital Library.

Gibbons, Phillip, B. et al., "Distributed Streams Algorithms for Sliding Windows,"SPAA '02, Winnipeg, Manitoba, Canada, Aug. 10-13, 2002, pp. 63-72, ACM Digital Library.

Malbasa, Vuk et al., "A Reservoir Sampling Algorithm with Adaptive Estimation of Conditional Expectation," Proceedings of International Joint Conference on Neural Networks, Orlando, Florida, USA, Aug. 12-17, 2007, 5 pages, IEEE, Washington, DC, USA.

Yi, Ke et al., "Optimal Tracking of Distributed Heavy Hitters and Quantiles," PODS '09, Providence, Rhode Island, USA, Jun. 29-Jul. 2, 2009, pp. 167-174, ACM Digital Library.

\* cited by examiner

Process Initialization at Site $i$.

```
/* u_i is site i's view of the s-th smallest weight in the
   union of all streams so far. Note this may ``lag'' the
   value stored at the coordinator.                       */
u_i ← 1;
```

FIG. 1

Process When Site $i$ receives element $e$.

Let $w(e)$ be a randomly chosen weight between 0 and 1;
if $w(e) < u_i$ then
 | Send $(e, w(e))$ to the Coordinator and receive $u'$ from Coordinator;
 | Set $u_i \leftarrow u'$;

FIG. 2

Process at Coordinator.

/* The random sample $\mathcal{P}$ consists of tuples $(e, w)$ where $e$ is an element, and $w$ the weight, such that the weights are the $s$ smallest among all the weights so far in the stream */
$\mathcal{P} \leftarrow \phi$;
/* $u$ is the value of the $s$-th smallest weight in the stream observed so far. If there are less than $s$ elements so far, then $u$ is 1. */
$u \leftarrow 1$;
while *true* do
    if *a message $(e_i, u_i)$ arrives from site $i$* then
        if $u_i < u$ then
            Insert $(e_i, u_i)$ into $\mathcal{P}$;
            if $|\mathcal{P}| > s$ then
                Discard the element $(e, w)$ from $\mathcal{P}$ with the largest weight;
                Update $u$ to the current largest weight in $\mathcal{P}$ (which is also the $s$-th smallest weight in the entire stream);
        Send $u$ to site $i$;
    if *a query for a random sample arrives* then
        return $\mathcal{P}$

RANDOM SAMPLING FROM DISTRIBUTED STREAMS

STATEMENT OF GOVERNMENT INTEREST

This invention was made with government support under grant numbers: CNS0834743 and CNS0831903, awarded by the National Science Foundation. The government has certain rights in the invention.

FIELD OF THE INVENTION

The subject matter presented herein generally relates to optimal random sampling from distributed streams of data.

BACKGROUND

For many data analysis tasks, it is impractical to collect all the data at a single site and process it in a centralized manner. For example, data arrives at multiple network routers at extremely high rates, and queries are often posed on the union of data observed at all the routers. Since the data set is changing, the query results could also be changing continuously with time. This has motivated the continuous, distributed, streaming model. In this model there are k physically distributed sites receiving high-volume local streams of data. These sites talk to a central coordinator that has to continuously respond to queries over the union of all streams observed so far. A challenge is to minimize the communication between the different sites and the coordinator, while providing an accurate answer to queries at the coordinator at all times.

A problem in this setting is to obtain a random sample drawn from the union of all distributed streams. This generalizes the classic reservoir sampling problem to the setting of multiple distributed streams, and has applications to approximate query answering, selectivity estimation, and query planning. For example, in the case of network routers, maintaining a random sample from the union of the streams is valuable for network monitoring tasks involving the detection of global properties. Other problems on distributed stream processing, including the estimation of the number of distinct elements and heavy hitters, use random sampling as a primitive.

The study of sampling in distributed streams was initiated by prior work. Consider a set of k different streams observed by the k sites with the total number of current items in the union of all streams equal to n. Prior work has shown how k sites can maintain a random sample of s items without replacement from the union of their streams using an expected $O((k+s)\log s)$ messages between the sites and the central coordinator. The memory requirement of the central coordinator is s machine words, and the time requirement is $O((k+s)\log n)$. The memory requirement of the remote sites is a single machine word with constant time per stream update. Prior work has also proven that the expected number of messages sent in any scheme is $(k+s \log(n/s))$. Each message is assumed to be a single machine word, which can hold an integer of magnitude poly(kns).

BRIEF SUMMARY

One aspect provides a method for distributed sampling on a network with a plurality of sites and a coordinator, comprising: receiving at the coordinator a data element from a site of the plurality of sites, said data element having a weight randomly associated therewith deemed reportable by comparison at the site to a locally stored global value; comparing the weight of the data element received with a global value stored at the coordinator; and performing one of: updating the global value stored at the coordinator to the weight of the data element received; and communicating the global value stored at the coordinator back to the site of the plurality of sites.

Another aspect provides a computer program product for distributed sampling on a network with a plurality of sites and a coordinator, comprising: a computer readable storage medium having computer readable program code embodied therewith, the computer readable program code comprising: computer readable program code configured to receive, at the coordinator, a data element from a site of the plurality of sites, said data element having a weight randomly associated therewith deemed reportable by comparison at the site to a locally stored global value; computer readable program code configured to compare the weight of the data element received with a global value stored at the coordinator; and computer readable program code configured to perform one of: updating the global value stored at the coordinator to the weight of the data element received; and communicating the global value stored at the coordinator back to the site of the plurality of sites.

A further aspect provides a system comprising: at least one processor; and a memory device operatively connected to the at least one processor; wherein, responsive to execution of program instructions accessible to the at least one processor, the at least one processor is configured to: receive at the coordinator a data element from a site of the plurality of sites, said data element having a weight randomly associated therewith deemed reportable by comparison at the site to a locally stored global value; compare the weight of the data element received with a global value stored at the coordinator; and perform one of: updating the global value stored at the coordinator to the weight of the data element received; and communicating the global value stored at the coordinator back to the site of the plurality of sites.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the claims, but is merely representative of those embodiments.

Reference throughout this specification to "embodiment(s)" (or the like) means that a particular feature, structure, or characteristic described in connection with the embodiment is included in at least one embodiment. Thus, appearances of the phrases "according to embodiments" or "an embodiment" (or the like) in various places throughout this specification are not necessarily all referring to the same embodiment.

Furthermore, the described features, structures, or characteristics may be combined in any suitable manner in different embodiments. In the following description, numerous specific details are provided to give a thorough understanding of example embodiments. One skilled in the relevant art will recognize, however, that aspects can be practiced without certain specific details, or with other methods, components, materials, et cetera. In other instances, well-known structures, materials, or operations are not shown or described in detail to avoid obfuscation.

Regarding notation used herein, all algorithms are to the base 2 unless otherwise specified. Throughout the description, when asymptotic notation is used, the variable that is going to infinity is n, and s and k are functions of n.

A problem addressed by embodiments is that of distributed sampling. Namely, if there are k sites, each receiving a traffic stream, such as routers on a network, together with a central coordinator, the central coordinator's job is to maintain a statistic on the union of the k streams, such as the number of distinct elements, the heavy hitters or iceberg queries, et cetera. A challenge is that the stream is distributed across these k sites, and the sites should have as little communication as possible with the coordinator or with each other in order to minimize communication bandwidth, central coordinator computation time, et cetera.

A key primitive underlying statistics of interest is that of maintaining a random sample, or more generally s random samples, from the union of these streams. Given this, one may immediately obtain a protocol for finding the heavy hitters or estimating the number of distinct elements with related message (communication) complexity. Prior work established a protocol for doing this with $O((k+s)\log n)$ communication, where n is the length of the union of the streams. Such a protocol was not known to be optimal, and obtaining more practical protocols, which also asymptotically improve this complexity, is a problem addressed herein.

Accordingly, embodiments provide a new protocol that significantly improves the previous best protocol in the case that s is not too large, while k is large. Embodiments have the added benefit that the coordinator only communicates with a site when the site initiates the communication. Thus, it is possible for sites to go offline without affecting the correctness of the protocol, unlike in previous protocols. In many practical scenarios one first samples a small percentage of the stream, then runs whatever analysis is desired on the sampled stream. Embodiments give a more efficient way of doing this when the stream is distributed.

Embodiments have asymptotic message complexity $$O\left(\frac{k\log(n/s)}{\log(1+(k/s))}\right),$$

which gives at least a log k factor savings in theory and often an even larger speed-up in practice. Further, embodiments are shown to be optimal in message complexity, as no protocol can do better by more than a fixed constant factor (independent of n, s and k).

Essentially embodiments employ a protocol that hashes all stream tokens to a random number between [0,1] and maintains a minimum value. Clearly this is a random sample from the union of the streams. The value of the minimum is also roughly 1/(# of distinct elements), so one obtains a rough estimate this way. More refined estimates can be obtained by obtaining s samples.

Thus, an embodiment provides for sampling from distributed streams, as well as a matching lower bound showing that the message complexity of this approach is optimal. In an embodiment, sensors assign random numbers to their received data elements from the data streams. By comparing the random number assigned for a given data element to a current global threshold value, the sensors determine when it may be appropriate to report a sample back to a coordinator node. For example, when the random number value is lower than the current global threshold value, the sensor may report the sample back to the coordinator. The coordinator node in turn monitors received samples from the sensors, and notifies them that a reported sample either establishes a new global threshold value (for example, a new minimum to be used for comparison), or indicates that the sensor that reported the sample should update its current global threshold value.

An embodiment provides a process for distributed sampling using an expected $$O\left(\frac{k\log(n/s)}{\log(1+(k/s))}\right)$$

number of messages for continuously maintaining a random sample size of s from k distributed data streams of total size n. Notice that if $s<k/8$, this number is $$O\left(\frac{k\log(n/s)}{\log(k/s)}\right),$$

while if $s \leq k/8$, this number is $O(s \log(n/s))$.

The memory requirement in the protocol at the central coordinator is s machine words, and the time requirement is $$O\left(\frac{k\log(n/s)}{\log(1+(k/s))}\right).$$

The former is the same as in prior work, while the latter improves on a prior $O((k+s)\log n)$ time requirement. The remote sites store a single machine word and use a constant time per stream update, which is clearly optimal. This leads to a significant improvement in the message complexity in the case when k is large. For example, for the basic problem of maintaining a single random sample from the union of distributed streams (s=1), an embodiment leads to a factor of O(log k) decrease in the number of messages sent in the system over prior work. Table 1 illustrates a summary of the results for message complexity of sampling without replacement.

TABLE 1

|  | Upper Bound | | Lower Bound | |
| --- | --- | --- | --- | --- |
|  | Embodiment | Prior Work | Embodiment | Prior Work |
| $s < \frac{k}{s}$ | $O\left(\frac{k\log(n/s)}{\log(k/s)}\right)$ | $O(k\log n)$ | $\Omega\left(\frac{k\log(n/s)}{\log(k/s)}\right)$ | $\Omega(k + s\log n)$ |
| $s \geq \frac{k}{s}$ | $O(s\log(n/s))$ | $O(k\log n)$ | $\Omega(s\log(n/s))$ | $\Omega(s\log(n/s))$ |

The approach employed by embodiments is straightforward and reduces the communication necessary, as the coordinator communicates with a sensor (site) if the site initiates the communication. This is useful in a setting where a site may go offline, since it does not require the ability of the site to receive broadcast messages.

Regarding a lower bond, it is described herein that for any constant q>0, any correct protocol must send $$\Omega\left(\frac{k\log(n/s)}{\log(1+(k/s))}\right)$$

messages with probability at least 1−q. This also yields a bound of $$\Omega\left(\frac{k\log(n/s)}{\log(1+(k/s))}\right)$$

on the expected message complexity of any correct protocol, showing the expected number of messages sent by embodiments is optimal, up to constant factors.

In addition to being quantitatively stronger than the lower bound of prior work, the lower bound of embodiments is also qualitatively stronger because the lower bound in prior work is on the expected number of messages transmitted in a correct protocol. However, this does not rule out the possibility that with large probability, much fewer messages are sent in the optimal protocol. In contrast, embodiments lower bound the number of messages that must be transmitted in any protocol 99% of the time. Since the time complexity of the central coordinator is at least the number of messages received, the time complexity of embodiments is also optimal.

The protocol used may also be modified in other embodiments to obtain a random sample of s items from k distributed streams with replacement. Here, a protocol with $$O\left(\left(\frac{k}{\log(2+(k/(s\log s)))}+\log(s)\right)\log n\right)$$

messages is provided, improving the O((k+s log s)log n) message protocol of prior work. The same improvement in the time complexity of the coordinator is achieved.

As a corollary, a protocol for estimating the heavy hitters in distributed streams with the best known message complexity is provided. In this problem, a set of H items is sought such that if an element e occurs at least an $\epsilon$ fraction of times in the union of streams, then e∈H, and if e occurs less than an $\epsilon/2$ fraction of times in the union of the streams, then e∉H. It is known that O ($\epsilon^{-2}$ log n) random samples suffice to estimate the set of heavy hitters with high probability, and the previous best algorithm was obtained by plugging s=O($\epsilon^{-2}$ log n) into a protocol for distributed sampling. Embodiments thus improve the message complexity from O((k+$\epsilon^{-2}$ log n)log n) to $$O\left(\frac{k\log(\varepsilon n)}{\log(\varepsilon k)}+\varepsilon^{-2}(\varepsilon n)\log n\right).$$

This can be significant when k is large compared to $1/\epsilon$.

It should be noted that the model used in this description is that of a proactive coordinator, as opposed to prior proposed reactive coordinators, which do not continuously maintain an estimate of the required aggregate, but only obtain an estimate when a query is posed to the coordinator. Moreover, this description concerns the case of non-sliding window, and does not concern the case of sliding windows.

The description now turns to the figures. The illustrated example embodiments will be best understood by reference to the figures. The following description is intended only by way of example and simply illustrates certain example embodiments representative of the invention, as claimed Model Referring to FIG. 4 generally, consider a system with k different sites (sensors 410, 420), numbered from 1 to k, each receiving a local stream of elements. Let $S_i$ denote the stream observed at site i. There is one coordinator node 430, which is different from any of the sites. The coordinator does not observe a local stream, but all queries for a random sample arrive at the coordinator. Let $S=\cup_{i=1}^n S_z$ be the entire stream observed by the system, and let n=$S$. The sample size s is a parameter supplied to the coordinator 430 and to the sites 410, 420 during initialization.

Figure 4:
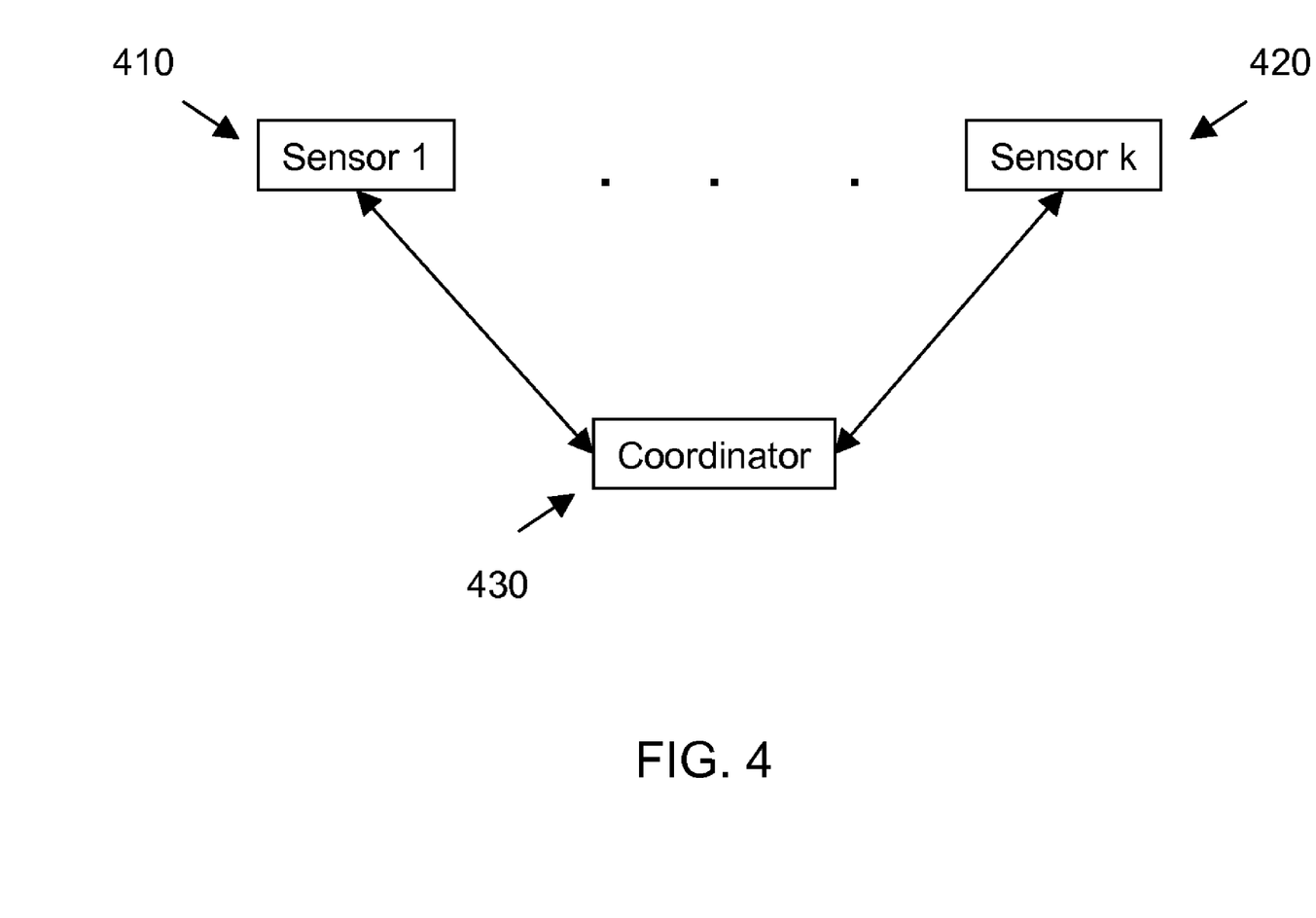
FIG. 4 illustrates an example coordinator and site network environment.

The task of the coordinator 430 is to continuously maintain a random sample $\mathcal{P}$ of size min {n, s} consisting of elements chosen uniformly at random without replacement from $S$. The cost of the protocol is the number of messages transmitted.

Assuming a synchronous communication model, where the system progresses in "rounds", in each round, each site 410, 420 can observe one element (or none), and send a message to the coordinator 430, and receive a response from the coordinator. The coordinator 430 may receive up to k messages in a round, and respond to each of them in the same round. Thus, in some respects, this model is similar to the model in previous work. The case where multiple elements are observed per round is further described herein.

The sizes of the different local streams at the sites 410, 420, their order of arrival and the interleaving of the streams at different sites can all be arbitrary. The process utilized by embodiments makes no assumptions regarding these.

Process

The basic approach behind the process is essentially as follows. Each site 410, 420 associates a random "weight" with each element that it receives. The coordinator 430 then maintains the set $\mathcal{P}$ of s elements with the minimum weights in the union of the streams at all times, and this is a random sample of $S$. The approach is similar to the spirit in all centralized reservoir sampling. In a distributed setting, an interesting aspect is at what times the sites 410, 420 communicate with the coordinator 430, and vice versa.

In an embodiment, the coordinator 430 maintains u, which is the s-th smallest weight so far in the system, as well as the sample, $\mathcal{P}$, consisting of all the elements that have weight no more than u. Each site 410, 420 need only maintain a single value $u_i$, which is the site's view of the s-th smallest weight in the system so far. Note that it is too expensive to keep the view of each site synchronized with the coordinator's view at all times—to see this, note that the value of the s-th smallest weight changes O(s log(n/s)) times, and updating every site each time the s-th minimum changes takes a total of O(sk log(n/s)) messages.

In an embodiment, when site i sees an element with a weight smaller than $u_i$, it sends it to the central coordinator 430. The coordinator 430 updates u and $\mathcal{P}$ if needed, and then replies back to i with the current value of u, which is the true minimum weight in the union of all streams. Thus, each time a site communicates with the coordinator 430, it either makes a change to the random sample, or, at least, gets to refresh its view of u.

Figure 1:
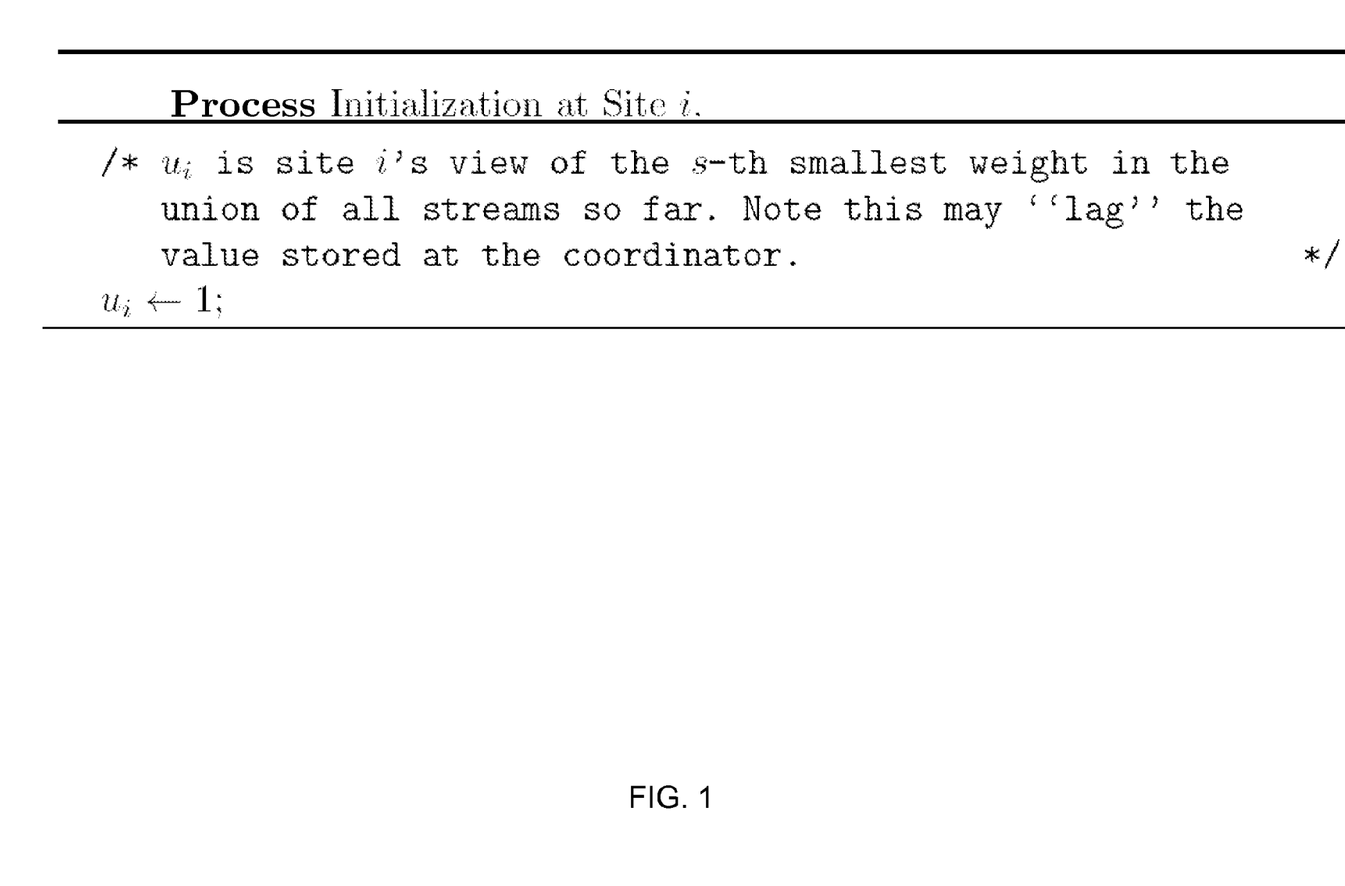
FIGS. 1-3 illustrate an example protocol for random sampling.
Figure 2:
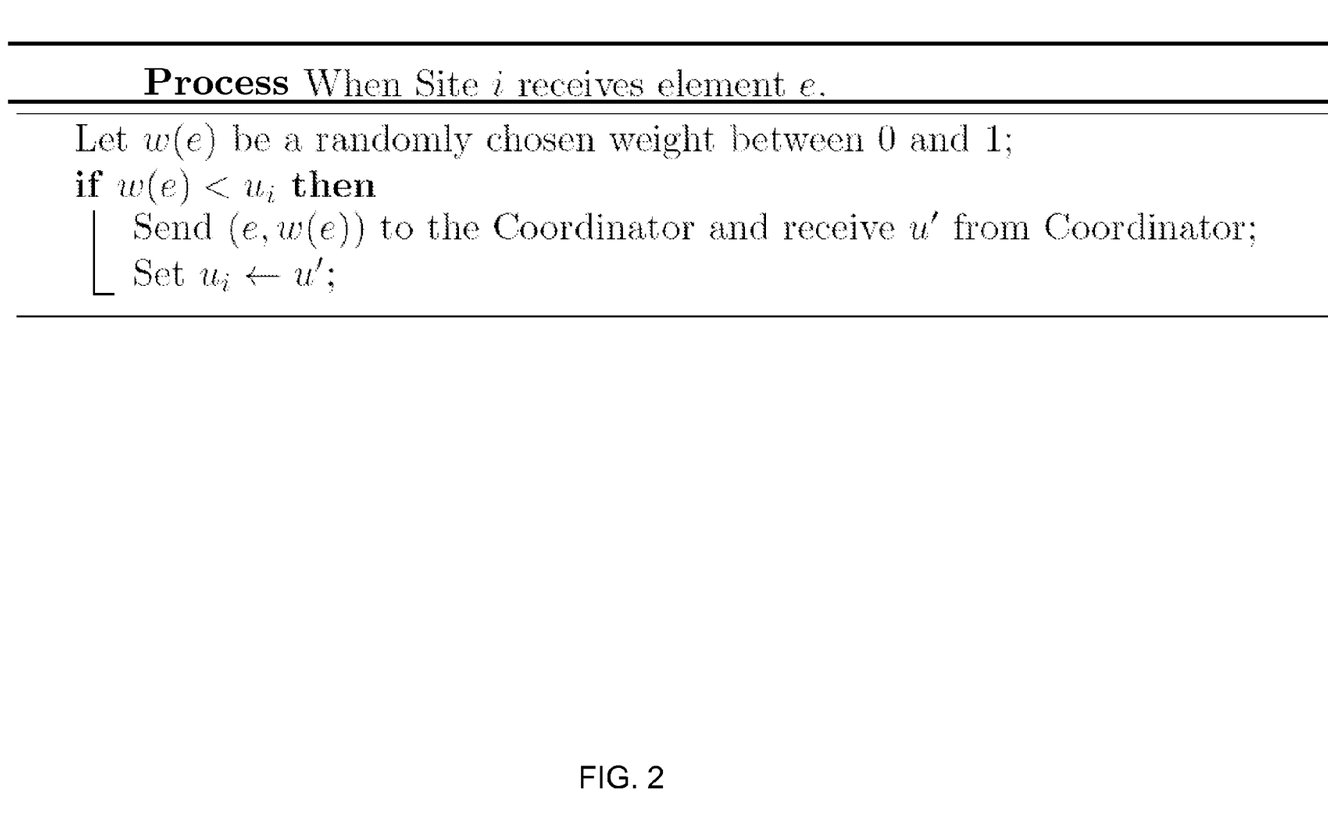
Figure 3:
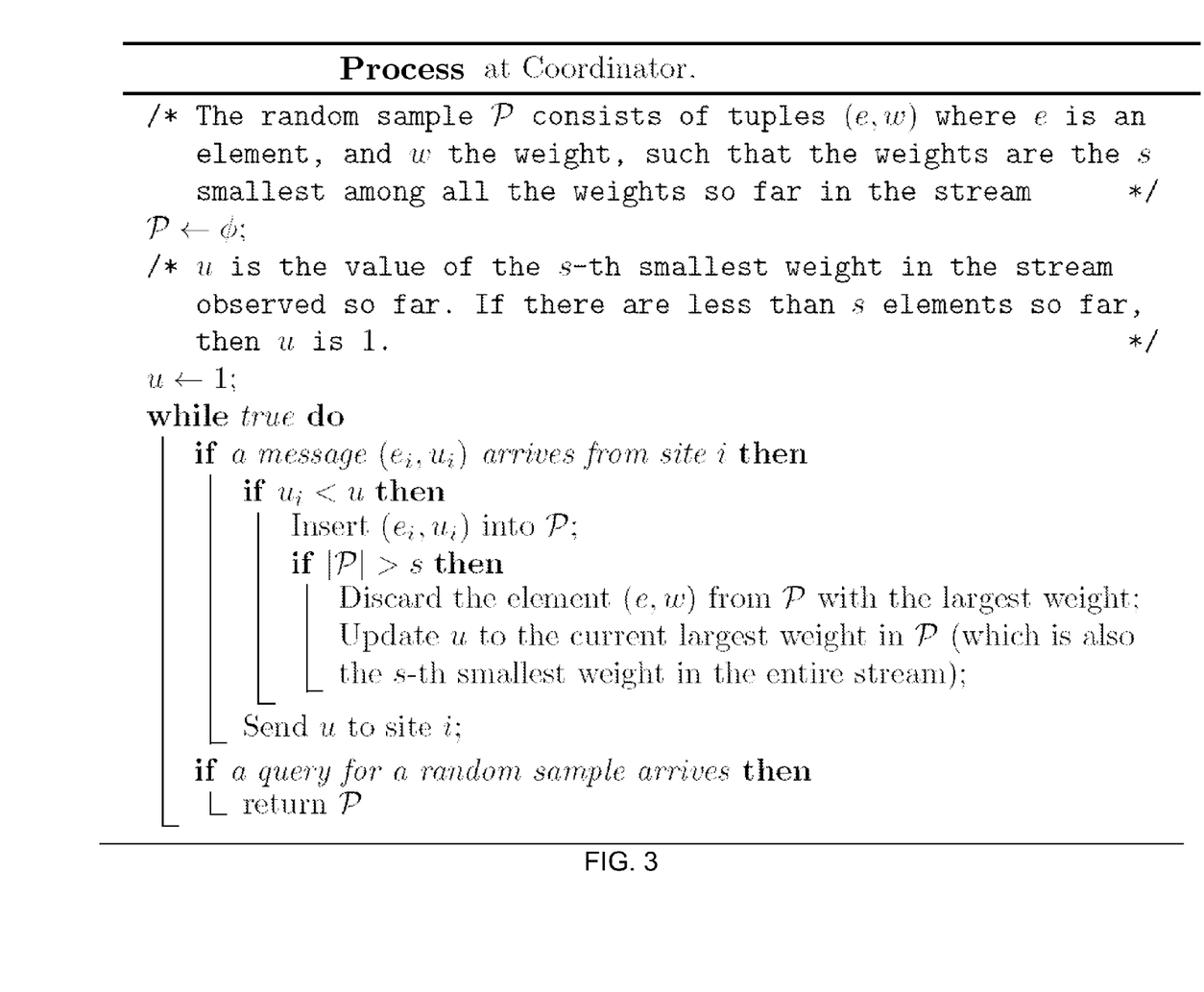

FIGS. 1-2 generally illustrate the process at each site. The process at the coordinator is generally illustrated at FIG. 3. The following two lemmas establish the correctness of the process.

Lemma 1.

Let n be the number of elements in $S$ so far. (1) If n≤s, then the set $\mathcal{P}$ at the coordinator contains all the (e,w) pairs seen at all the sites so far. (2) If n>s, then $\mathcal{P}$ at the coordinator consists of the s(e,w) pairs such that the weights of the pairs in $\mathcal{P}$ are the smallest weights in the stream so far. The proof of this lemma is immediate from the description of the protocol.

Lemma 2.

At the end of each round, sample $\mathcal{P}$ at the coordinator consists of a uniform random sample size of min {n, s} chosen without replacement from $\mathcal{S}$.

Proof.

In case n≦s, it is known that $\mathcal{P}$ contains every element of $\mathcal{S}$. In case n>s, from Lemma 1, it follows that $\mathcal{P}$ consists of s elements with the smallest weights from $\mathcal{S}$. Since the weights are assigned randomly, each element in $\mathcal{S}$ has a probability of $$\frac{s}{n}$$

belonging in $\mathcal{P}$, showing that this is a uniform random sample. Since an element can appear no more than once in the sample, this is a sample chosen without replacement.

Analysis

Now described are the message complexity and the maintenance of a random sample. For the sake of description, execution of the process is divided into "epochs", where each epoch consists of a sequence of rounds. The epochs are defined inductively. Let r>1 be a parameter, which will be fixed later. Recall that u is the s-th smallest weight so far in the system (if there are fewer than s elements so far, u=1). Epoch 0 is the set of all rounds from the beginning of execution unit (and including) the earliest round where u is $$\frac{1}{r}$$

or smaller. Let $m_i$ denote the value of u at the end of epoch i−1. Then epoch i consists of all rounds subsequent to epoch i−1 until (and including) the earliest round when u is $$\frac{m_i}{r}$$

or smaller. Note that the process does not need to be aware of the epochs, and the description of epochs is only used for ease of description.

If the original distributed system process illustrated in FIGS. 3 and 2 are referred to as Process A, for the analysis, a slightly different distributed process, Process B is described. Process B is identical to Process A except for the fact that at the beginning of each epoch, the value u is broadcast by the coordinator to all sites.

While Process A is natural, Process B is easier to analyze. First, it is noted that the same inputs, the value of u (and $\mathcal{P}$ )) at the coordinator, at any round in Process B is identical to the value of u (and $\mathcal{P}$ ) at the coordinator in Process A at the same round. Hence, the partitioning of rounds into epochs is the same for both processes, for a given input. The correctness of Process B follows from the correctness of Process A. The only difference between them is in the total number of messages sent. In Process B, there is a property that for all i from 1 to k, $u_i$=u at the beginning of each epoch (though this is not necessarily true throughout the epoch), and for this, Process B has to pay a cost of at least k messages in each epoch.

Lemma 3.

The number of messages sent by Process A for a set of streams $\mathcal{S}_j$, j−1 is never more than twice the number of messages sent by Process B for the same input.

Proof.

Consider site v in a particular epoch i. In Process B, v receives $m_i$ at the beginning of the epoch through a message from the coordinator. In Process A, v may not know m, at the beginning of epoch i. Two cases are considered.

Case I: v sends a message to the coordinator in epoch i in Process A. In this case, the first time v sends a message to the coordinator in this epoch, v will receive the current value of u, which is smaller than or equal to $m_i$. This communication costs two messages, one in each direction. Henceforth, in this epoch, the number of messages sent in Process A is no more than those sent in Process B. In this epoch, the number of messages transmitted to/from v in Process A is at most twice the number of messages as in Process B, which has at least one transmission from the coordinator to site v.

Case II: v did not send a message to the coordinator in this epoch, in Process A. In this case, the number of messages sent in this epoch to/from site v in Process A is smaller than in Process B.

Let $\xi$ denote the total number of epochs.

Lemma 4.

If r≧2, $$E|\xi| \le \left(\frac{\log(n/s)}{\log s}\right) + 2$$

Proof.

Let $$z = \left(\frac{\log(n/r)}{\log r}\right).$$

First, it is noted that in each epoch, u decreases by a factor of at least r. Thus, after (z+1) epochs, u is no more than $$\frac{1}{r^{z+1}} = \left(\frac{r}{n}\right)\frac{1}{r^{l}}.$$

Thus, $$Pr[\xi \ge z + l] \le Pr\left[u \le \left(\frac{s}{n}\right)\frac{1}{r^{l}}\right]$$

Let Y denote the number of elements (out of n) that have been assigned a weight of $$\frac{s}{nr^{l}}$$

or less. Y is a binomial random variable with expectation $$\frac{s}{r^{l}}.$$

Note that if $$u \leq \frac{s}{nr^l},$$

it must be true that Y>s.

$$Pr[\xi \geq z + l] \leq Pr[Y \geq s] \leq Pr[Y \geq r^l E[Y]] \leq \frac{1}{r^l}$$

where Markov's inequality has been used.
Since $\xi$ takes only positive integral values, $$E[\xi] = \sum_{i>0} Pr[\xi \geq i] =$$

$$\sum_{i=1}^{z} Pr[\xi \geq i] + \sum_{l \geq 1} Pr[\xi \geq z + l] \leq z + \sum_{l \geq 1} \frac{1}{r^l} \leq z + \frac{1}{1 - 1/r} \leq z + 2$$

where $r \geq 2$.

Let $n_j$ denote the total number of elements that arrived in epoch j, thus $n = \sum_{j=0}^{\xi-1} n_j$. Let $\mu$ denote the total number of messages sent during the entire execution. Let $\mu_i$ denote the total number of messages sent in epoch i. Let $X_i$ denote the number of messages sent from the sites to the coordinator in epoch i, $\mu_i$ is the sum of two parts, (1) k messages sent by the coordinator at the start of the epoch, and (2) two times the number of messages sent from the sites to the coordinator.

$$\mu_i = k + 2X_i \quad (1)$$

$$\mu = \sum_{j=0}^{\xi-1} \mu_i = \xi k + 2 \sum_{j=0}^{\xi-1} X_j \quad (2)$$

Consider epoch i. For each element j=1 . . . n in epoch i, a 0-1 random variable $Y_j$ is defined as follows. $Y_j=1$ if observing the j-th element in the epoch resulted in a message being sent to the coordinator, and $Y_j=0$ otherwise.

$$X_i = \sum_{j=1}^{n_i} Y_j \quad (3)$$

Let $F(n,\alpha)$ denote the event $n=\eta$ and $m_i=\alpha$. The following Lemma gives a bound on a conditional probability that is described later.
Lemma 5.
For each j=1 . . . $n_i-1$ $$Pr[Y_j = 1 \mid F(\eta, \alpha)] \leq \frac{\alpha - \alpha/r}{1 - \alpha/r}$$

Proof.
Suppose that the j-th element in the epoch was observed by site v. For this element to cause a message to be sent to the coordinator, the random weight assigned to it must be less than $u_v$ at that instant. Conditioned on $m_i=\alpha$, $u_v$ is no more than $\alpha$.

Note that in this lemma, the last element that arrived in epoch i is excluded. Thus, the weight assigned to element j must be greater than $\alpha/r$. Thus, the weight assigned to j must be a uniform random number in the range ($\alpha/r$, 1). The probability this weight is less than the current value of $u_v$ is no more than $$\frac{\alpha - \alpha/r}{1 - \alpha/r},$$

since $u_v \leq \alpha$.
Lemma 6.
For each epoch i $$E[X_i] 1 + 2rs$$

Proof.
The expectation conditioned on $F(\eta,\alpha)$ is first obtained, and then the conditioning is removed. From Lemma 5 and Equation 3:

$$E[F_i \mid F(\eta, \alpha)] \leq 1 + E\left[\left(\sum_{j=1}^{\eta-1} Y_j\right) F(\eta, \alpha)\right] \leq$$

$$1 + \sum_{j=1}^{\eta-1} E[Y_j \mid F(\eta, \alpha)] \leq 1 + (\eta - 1)\frac{\alpha - \alpha/r}{1 - \alpha/r}$$

Using $r \geq 2$ and $\alpha \leq 1$ gives $E[X_i | F(\eta,\alpha)] \leq 1 + 2(\eta-1)\alpha$.
Next considered is the conditional expectation $E[X_i | m_i = \alpha]$.

$$E[X_i \mid m_i = \alpha] = \sum_{\eta} Pr[n_i = \eta \mid m_i = \alpha] E[X_i n_i = \eta, m_i = \alpha]$$

$$\leq \sum_{\eta} Pr[n_i = \eta \mid\mid m_i = \alpha](1 + 2(\eta - 1)\alpha)$$

$$\leq E[1 + 2(n_i - 1)\alpha \mid m_i = \alpha]$$

$$\leq 1 + 2\alpha(E[n_i \mid m_i = \alpha] - 1)$$

Using Lemma 7 gives $$E[X_i \mid m_i = \alpha] \leq 1 + 2\alpha\left(\frac{rs}{\alpha} - 1\right) \leq 1 + 2rs$$

since $E[X_i] = E[E[X_i | m_i = \alpha]]$, $E[E_i] \leq E[1 + 2rs] = 1 + 2rs$.
Lemma 7.

$$E[X_i \mid m_i = \alpha] = \frac{rs}{\alpha}$$

Proof.
Recall that $n_i$, the total number of elements in epoch i, is the number of elements observed until the s-th minimum in the stream decreases to a value that is less than or equal to $\alpha/r$.
Let Z denote a random variable that equals the number of elements to be observed from the start of epoch i until s new elements are seen, each of whose weight is less than or equal to $\alpha/r$. Clearly, conditioned on $m_i=\alpha$, it must be true that $n_i \leq Z$. For j=1 to s, let $Z_j$ denote the number of elements observed from the state when (j-1) elements have been observed with weights that are less than $\alpha/r$ until the state when j elements have been observed with weights less than $\alpha/r$. $Z_j$ is a geometric random variable with parameter $\alpha/r$.

Having $$Z = \sum_{j=1}^{s} Z_j \text{ and } E[Z] = \sum_{j=1}^{s} E[Z_j] = \frac{rs}{\alpha},$$

and since $E[n_i | m_i = \alpha] \leq E[Z]$, the lemma follows.

Lemma 8.

$$E[\mu] \leq (k + 4rs + 2)\left(\frac{\log(n/s)}{\log r} + 2\right)$$

Proof.

Using Lemma 6 and Equation 1, the expected number of messages in epoch i is:

$$E[\mu_i] \leq k + 2(2rs+1) = k + 2 + 4rs$$

Note that the above is independent of i. The proof follows from Lemma 4, which gives an upper bound on the expected number of epochs.

Theorem 1.

The expected message complexity $E[\mu]$ of the process is as follows.

$$I: \text{ If } s \geq \frac{k}{8}, \text{ then } E[\mu] = O\left(s \log\left(\frac{n}{s}\right)\right)$$

$$II: \text{ If } s < \frac{k}{8}, \text{ then } E[\mu] = O\left(\frac{k \log\left(\frac{n}{s}\right)}{\log \frac{k}{s}}\right)$$

Proof.

It is noted that the upper bounds on $E[\mu]$ in Lemma 8 hold for any value of $r \geq 2$.

Case I:

$$s \geq \frac{k}{8}.$$

In this case, r is set to equal 2. From Lemma 8, $$E[\mu] \leq (8s + 8s + 2)\left(\frac{\log(n/s)}{\log 2}\right) = (16s + 2)\log\left(\frac{n}{s}\right) = O\left(s \log\left(\frac{n}{s}\right)\right)$$

Case II:

$$s < \frac{k}{8}.$$

Minimizing the expression setting $$r = \frac{k}{4s}$$

yields $$E[\mu] = O\left(\frac{k \log\left(\frac{n}{s}\right)}{\log\left(\frac{k}{s}\right)}\right).$$

Lower Bound

Theorem 2. For any constant q, $0 < q < 1$, any correct protocol must send $$\Omega\left(\frac{k \log(n/s)}{\log(1 + (k/s))}\right)$$

messages with probability at least $1-q$, where the probability is taken over the protocol's internal randomness.

Proof.

Let $\beta = (1 + (k/s))$. Defining $$e = \theta\left(\frac{\log(n/s)}{\log(1 + (k/s))}\right)$$

epochs as follows: in the i-th epoch, $i \in \{0, 1, 2, \ldots, e-1\}$, there are $\beta^{i-1} k$ global stream updates, which can be distributed among the k servers in an arbitrary way.

A distribution on orderings of the stream updates is considered. Namely, on a totally-ordered stream $1, 2, 3 \ldots, n$ of n updates, and in the i-th epoch, the $\beta^{i-1} k$ updates are randomly assigned among the k servers, independently for each epoch. Let the randomness used for the assignment in the i-th epoch be denoted $\sigma_i$.

Considering the global stream of updates, suppose a sample set $\mathcal{P}$ of s is maintained without replacement. Letting $\mathcal{P}_i$ denote a random variable indicating the value of $\mathcal{P}$ after seeing i updates in the stream, the following lemma is used about random sampling.

Lemma 9. For any constant $q > 0$, there is a constant $C' = C'(q) > 0$ for which
- $\mathcal{P}$ changes at least $C' s = \log(n/s)$ times with probability at least $1-q$, and
- if $s < k/8$ and $k = \omega(1)$ and $e = \omega(1)$, then with probability at least $1-q/2$, over the choice of $\{\mathcal{P}_i\}$, there are at least $(1-(q/8))e$ epochs for which the number of times $\mathcal{P}$ changes in the epoch is at least $C' s = \log(1 + (k/s))$.

Proof.

Consider the stream $1, 2, 3 \ldots, n$ of updates. In the classical reservoir sampling algorithm, $\mathcal{P}$ is initialized to $1, 2, 3 \ldots, s$. Then, for each $i > s$, the i-th element is included in the current sample set $\mathcal{P}_i$ with probability $s/i$, in which case a random item in $\mathcal{P}_{i-1}$ is replaced with i.

For the first part of Lemma 9, let $X_i$ be an indicator random variable if i causes $\mathcal{P}$ to change. Let $X_i = \sum_{i=1}^{n} X_i$. Hence, $E[X_i] = 1$ for $1 \leq i \leq s$, and $E[X_i] = s/i$ for all $i > s$. Then $E[X] = s + \sum_{i=s+1}^{n} s/i = s + s(H_n - H_s)$, where $H_i = \ln i + O(1)$ is the i-th Harmonic number. Then all of the $X_i$ are independent indicator random variables. It follows by a Chernoff bound that $$Pr[X] < E[X/2] \leq \exp(-E[X]/8)$$

$$\leq \exp(-(s + s\ln(n/s) - O(1)/8)$$

$$\leq \exp(-\Theta(s))\left(\frac{s}{n}\right)^{s/8}.$$

There is an absolute constant $n_0$ so that for any $n \geq n_0$, this probability is less than any constant q, and so the first part of Lemma 9 follows.

For the second part of Lemma 9, consider the i-th epoch, i>0, which contains $\beta^{i-1}k$ consecutive updates. Let $Y_i$ be the number of changes in this epoch. Then $E[Y_i] \geq s(H_{\beta^{i-1}k} - H_{\beta^{i-2}k}) = \Omega(s \log \beta)$. Note that $\beta \geq 9$ since $s<k/8$ by assumption, and $\beta=1+k/s$. Since $Y_i$ can be written as a sum of independent indicator random variables, by a Chernoff bound, $$Pr[Y_i < E[Y_i]/2] \leq \exp(-E[Y_i]/8) \leq \exp(-\Omega(s\log\beta)) \leq \frac{1}{\beta^{\Omega(s)}}.$$

Hence, the expected number of epochs i for which $Y_i < E[Y_i]/2$ is at most $$\sum_{i=1}^{e} \frac{1}{\beta^{\Omega(s)}},$$

which is o(e) since $\beta \geq 9$ and $e=\omega(1)$. By a Markov bound, with probability at least $1-q/2$, at most $o(e/q)=o(e)$ epochs i satisfy $Y<E[Y_i]/2$. It follows that with probability at least $1-q/2$, there are at least $(1-q/8)e$ epochs i for which the number $Y_i$ of changes in the epochs i is at least $E[Y_i]/2 \geq C$'s log $\beta = C$'s log$(1+k/s))$ for a constant $C'>0$, as desired.

Corner Cases

When $s \geq k/8$, the statement of Theorem 2 gives a lower bound of $\Omega(s \log(n/s))$. In this case Theorem 2 follows immediately from the first part of Lemma 9 since these changes in $\mathcal{P}$ must be communicated to the central coordinator. Hence, in what follows it can be assumed that $s<k/8$. Notice also that if $k=O(1)$, then $$\frac{k\log(n/s)}{\log(1+(k/s))} = O(s\log(n/s)),$$

and so the theorem is independent of k, and it follows simply by the first part of Lemma 9. Notice also that if $e=O(1)$, then the statement of Theorem 2 amounts to providing an $\Omega(k)$ lower bound, which follows trivially since every site must send at least one message. Thus, in what follows, the second part of Lemma 9 may be applied.

Main Case: Let $C>0$ be a sufficiently small constant, depending on q, to be determined below. Let H be a possibly randomized protocol, which with probability of at least q, sends at most Cke messages. $\Pi$ can not be a correct protocol.

Let $\tau$ denote the random coin tosses of $\Pi$, that is, the concatenation of random strings of all k sites together with that of the central coordinator.

Let $\epsilon$ be the event that $\Pi$ sends less than Cke messages. By assumption, $Pr_\tau[\epsilon]$ q. Hence, it is also the case that $$Pr_{\tau,\{\mathcal{P}_i\},\{\sigma_i\}}[\epsilon] \geq q$$

For a sufficiently small constant $C'>0$ that may depend on q, let $\mathcal{F}$ be the event that there are at least $(1-(q/8))e$ epochs for which the number of times $\mathcal{P}$ changes in the epoch at least C's log$(1+k/s))$. By the second part of Lemma 9, $$Pr_{\tau\{\mathcal{P}_i\},\{\sigma_i\}}[\mathcal{F}] \geq 1-q/2$$

It follows that there is a fixing of $\tau=\tau'$ as well as a fixing of $\mathcal{P}_0, \mathcal{P}_1, \ldots, \mathcal{P}_e$ to $\mathcal{P}_0', \mathcal{P}_1', \ldots, \mathcal{P}_e'$ for which $\mathcal{F}$ occurs and $$Pr_{\{\sigma_i\}}[\epsilon \mid \tau=\tau', (\mathcal{P}_0, \mathcal{P}_1, \ldots, \mathcal{P}_e) = (\mathcal{P}_0', \mathcal{P}_1', \ldots \mathcal{P}_e')] \geq q - q/2 = q/2$$

Notice that the three (sets of) random variables $\tau$, $\{\mathcal{P}_i\}$, and $\{\sigma_i\}$ are independent, and so in particular, $\{\sigma_i\}$ is still uniformly random given this conditioning.

By a Markov argument, if event $\epsilon$ occurs, then there are at least $(1-(q/8))e$ epochs for which at most $(8/q) \cdot C \cdot k$ messages are sent. If events $\epsilon$ and $\mathcal{F}$ both occur, then by a union bound, there are at least $(1-(q/4))e$ epochs for which at most $(8/q) \cdot C \cdot k$ messages are sent and $\mathcal{P}$ changes in the epoch at least C's log$(1+k/s))$ times. Such an epoch is referred to herein as balanced.

Let i* be the epoch which is most likely to be balanced, over the random choices of $\{\sigma_i\}$, conditioned on $\tau=\tau'$ and $(\mathcal{P}_0, \mathcal{P}_1, \ldots, \mathcal{P}_e) = (\mathcal{P}_0', \mathcal{P}_1', \ldots, \mathcal{P}_e')$. Since at least $(1-(q/4))e$ epochs are balanced if $\epsilon$ and $\mathcal{F}$ occur, and conditioned on $(\mathcal{P}_0, \mathcal{P}_1, \ldots, \mathcal{P}_e) = (\mathcal{P}_0', \mathcal{P}_1', \ldots, \mathcal{P}_e')$ event $\mathcal{F}$ does occur, and $\epsilon$ occurs with probability at least $q/2$ given this conditioning, it follows that $$Pr_{\{\sigma_i\}}[i^* \text{ is balanced} \mid \tau=\tau', (\mathcal{P}_0, \mathcal{P}_1, \ldots, \mathcal{P}_e) = (\mathcal{P}_0', \mathcal{P}_1', \ldots \mathcal{P}_e')] \geq q/2 - q/4 = q/4$$

The property of i* being balanced is independent of $\sigma_j$ for $j \neq i$, so $$Pr_{\{\sigma_i\}}[i^* \text{ is balanced} \mid \tau=\tau', (\mathcal{P}_0, \mathcal{P}_1, \ldots, \mathcal{P}_e) = (\mathcal{P}_0', \mathcal{P}_1', \ldots \mathcal{P}_e')] \geq q/4$$

Since C's log$(1+k/s))>0$ and $\mathcal{P}$ changes at least C's log$(1+k s))$ times in epoch i*, $\mathcal{P}$ changes at least once in epoch i*. Suppose the first update in the global stream at which $\mathcal{P}$ changes is the j-th update. In order for i* to be balanced for at least a $q/4$ fraction of the $\sigma_{i^*}$, there must be at least $qk/4$ different servers which receive j*, for which H sends a message. In particular, since $\Pi$ is deterministic conditioned on $\tau$, at least $qk/4$ messages must be sent in the i-th epoch. But i* was chosen so that at most $(8/q) \cdot C \cdot k$ messages are sent, which is a contradiction for $C<q^2/32$.

It follows that a contradiction has been reached, and it also follows that Cke messages must be sent with probability at least $2-q$. Since $$Cke = \Omega\left(\frac{k\log(n/s)}{\log(1+(k/s))}\right),$$

this completes the proof

Sampling with Replacement

Now described is an example process to maintain a random sample of size s with replacement from $\mathcal{S}$. The basic idea is to run in parallel s copies of the single item sampling process described above. Done naively, this will lead to a message complexity of $$O\left(sk\frac{\log n}{\log k}\right).$$

Embodiments improve on this using the following.

Viewing the distributed streams as s logical streams, $\mathcal{S}^i$, i=1 ... s. Each $\mathcal{S}^i$ is identical to $\mathcal{S}$, but the process assigns independent weights to the different copies of the same element in the different logical streams. Let $\omega^i(e)$ denote the weight assigned to element e in $\mathcal{S}^i$. $\omega^i(e)$ is a random number between 0 and 1. For each i=1 ... s, the coordinator maintains the minimum weight, $\omega^i$, among all elements in $\mathcal{S}^i$, and the corresponding element.

Let $\beta/\max_{i=1}^{s}\omega^i$; $\beta$ is maintained by the coordinator. Each site j maintains $\beta_j$, a local view of $\beta$, which is always greater than or equal to $\beta$. Whenever a logical stream element at site j has a weight less than $\beta_j$, the site sends it to the coordinator, receives in response the current value of $\beta$, and updates $\beta_j$. When a random sample is requested at the coordinator, it returns the set of all minimum weight elements in all s logical streams. It can easily be seen that this process is correct, and at all times returns a random sample of size s selected with replacement. The main optimization relative to the naïve approach described above is that when a site sends a message to the coordinator, it receives $\beta$, which provides partial information about all $\omega^i$s. This provides a substantial improvement in the message complexity and leads to the following bounds Theorem 3.

The above process continuously maintains a sample of size s with replacement from $\mathcal{S}$, and its expected message complexity is O(s logs loge) in case k≦2s log s and $$O\left(k\frac{\log n}{\log\left(\frac{k}{s\log s}\right)}\right)$$

in case k>2s log s.

Proof.

A sketch of the proof is provided. The analysis of the message complexity is similar to the case of sampling without replacement. The analysis is sketched here and the details are omitted for the sake of compact description. The execution is divided into epochs, where in epoch i the value of $\beta$ at the coordinator decreases by at least a factor of r (a parameter to be determined). Let $\xi$ denote the number of epochs. It can be seen that $$E[\xi] = O\left(\frac{\log n}{\log s}\right).$$

In epoch i, let $X_i$ denote the number of messages sent from the sites to the coordinator in the epoch, $m_i$ denote the value of $\beta$ at the beginning of the epoch, and $n_i$ denote the number of elements S in that arrived in the epoch.

The $n_i$ elements in epoch i give rise to $sn_i$ logical elements, and each logical element has a probability of no more than $m_i$ of resulting in a message to the coordinator. Similar to the proof of Lemma 6, it can be shown using conditional expectations that $E[X_i] \leq rs \log s$. Thus, the expected total number of messages in epoch i is bounded by (k+2rs log s), and in the entire execution is $$O\left((k + 2rs\log s)\frac{\log n}{\log r}\right).$$

By choosing r=2 for the case k≦(2s log s), and r=k/(s log s) for the case k>(2s log s), the desired result is obtained.

Thus, in view of the foregoing description, and now referring again to FIG. 4, it can be appreciated that in an environment where a plurality of sensors 410, 420, such as network routers, handle streaming data elements, such as IP addresses, an embodiment provides for sampling from the distributed streams by maintaining a random sample at the coordinator 430 with a minimum use of bandwidth and message complexity. At the outset, all sensors 410, 420 assign a random number within a predetermined range (for example, 0-1) to a data element received and report it as an initial sample to the coordinator 430. The coordinator 430 in turn determines a global value (for example, a minimum or maximum value from the plurality of random numbers received thus far) from among the random numbers. The coordinator responds to those sensors, for example sensor 410, that have not reported the data element with the lowest random value. The coordinator's current lowest value (globally) is a random sample from the plurality of streams, as reported by sensors 410, 420.

Figure 5:
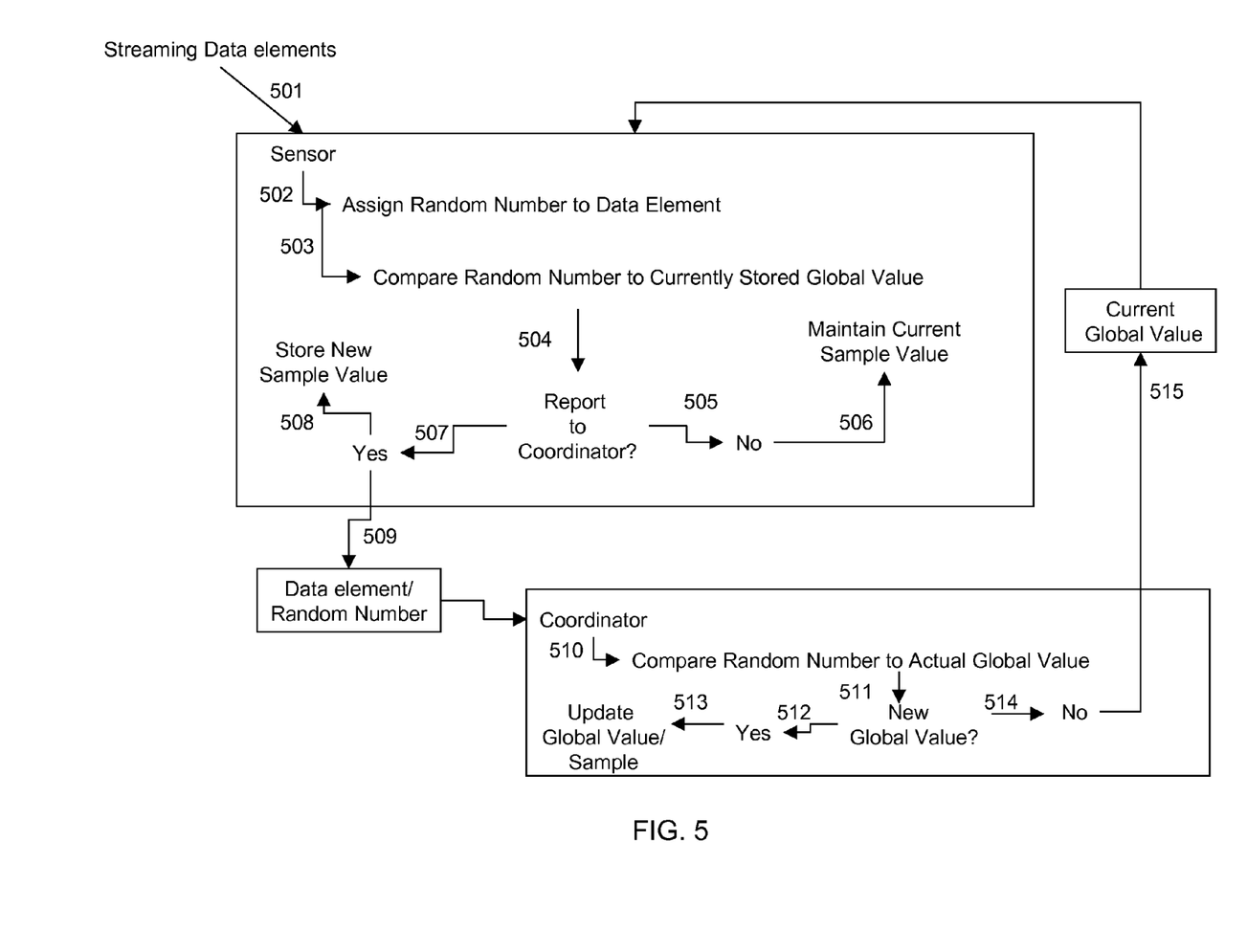
FIG. 5 illustrates an example method for random sampling from distributed streams.

Referring to FIG. 5, once a sensor (for example, sensor 410) has received a communication from the coordinator indicating the global value (for example, a global minimum value), the sensor continues receive data elements from the data stream 501 and continues to assign random numbers to the received data elements 502. By comparing 503 the random number assigned for a given data element to a current global threshold value, the sensors may determine 504 when it is appropriate to report a sample back to a coordinator node. The sensor may determine that the current random number value is not reportable 505, and may maintain its current sample 506.

However, when the random number value is reportable, for example being lower than the current global threshold value (last value received from the coordinator), the sensor may determine that it is appropriate report the sample back to the coordinator 507. In such a case, the sensor may store the new (locally) minimum value 508 and report it back to the coordinator 509.

The coordinator node in turn continues to compare such received sample values from the sensors 510, and determines if these reported values establish a new global value (global minimum in this example) 511. If so 512, the coordinator establishes a new global value 513. However, if the reported sample is determined to not establish a new global value (is not below the current global minimum value in this example) 514, the coordinator communicates with the reporting sensor the current global minimum such that the reporting sensor may update its current global threshold value 515.

Figure 6:
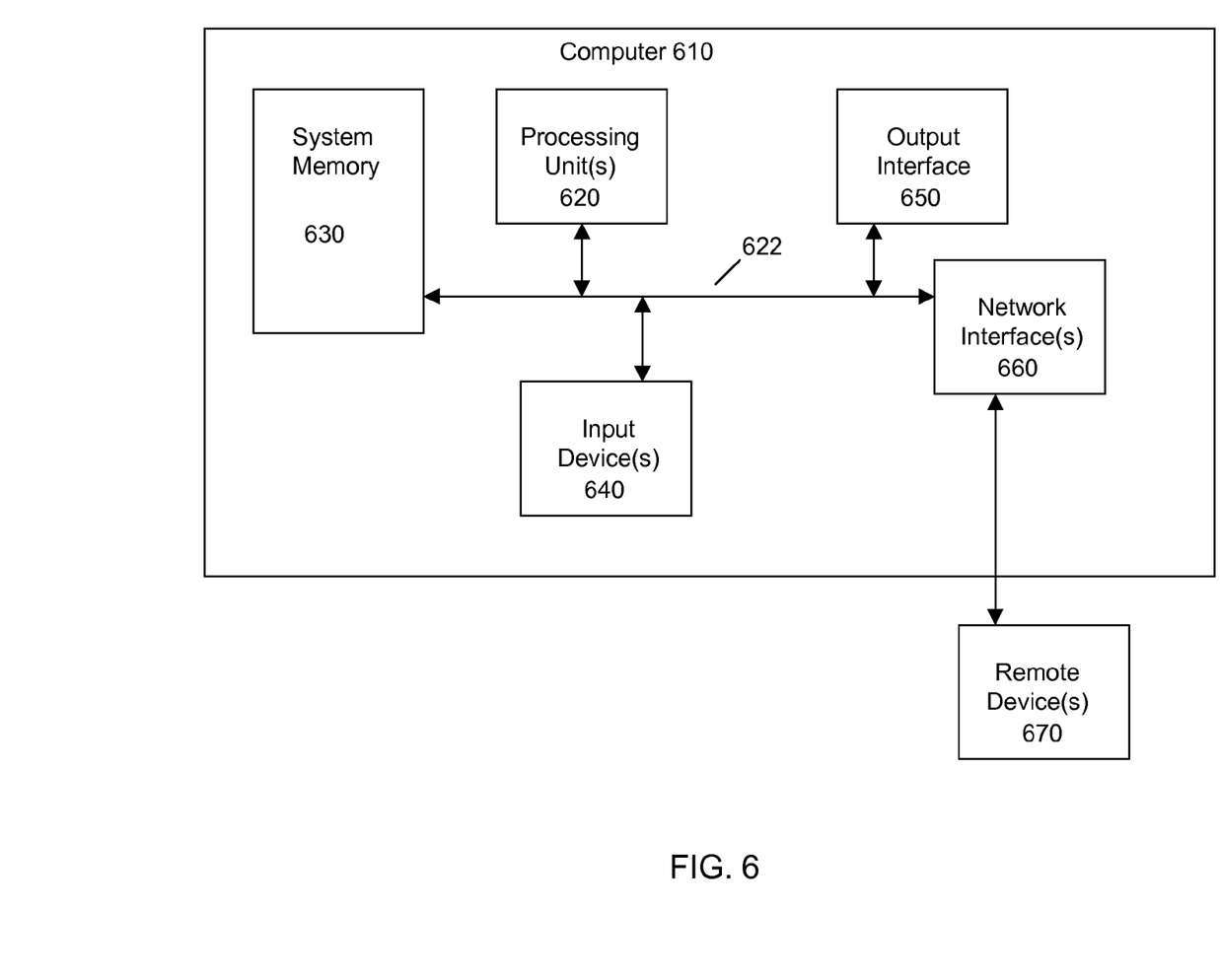
FIG. 6 illustrates an example computing device.

Referring to FIG. 6, it will be readily understood that embodiments may be implemented using any of a wide variety of devices or combinations of devices, for example for implementing sensor and/or coordinator functionality as described herein. An example device that may be used in implementing embodiments includes a computing device in the form of a computer 610. In this regard, the computer 610 may execute program instructions configured to provide for random sampling from distributed streams, and perform other functionality of the embodiments, as described herein.

Components of computer 610 may include, but are not limited to, at least one processing unit 620, a system memory 630, and a system bus 622 that couples various system components including the system memory 630 to the processing unit(s) 620. The computer 610 may include or have access to a variety of computer readable media. The system memory 630 may include computer readable storage media in the form of volatile and/or nonvolatile memory such as read only memory (ROM) and/or random access memory (RAM). By way of example, and not limitation, system memory 630 may also include an operating system, application programs, other program modules, and program data.

A user may interface with (for example, enter commands and information) the computer 610 through input devices 640. A monitor or other type of device can also be connected to the system bus 622 via an interface, such as an output interface 650. In addition to a monitor, computers may also include other peripheral output devices. The computer 610 may operate in a networked or distributed environment using logical connections (network interface 660) to other remote computers or databases (remote device(s) 670), such as for communication between sensors and coordinator. The logical connections may include a network, such local area network (LAN) or a wide area network (WAN), but may also include other networks/buses.

As will be appreciated by one skilled in the art, aspects may be embodied as a system, method or computer program product. Accordingly, aspects of the present invention may take the form of an entirely hardware embodiment, or an embodiment including software (including firmware, resident software, micro-code, et cetera) that may all generally be referred to herein as a "circuit," "module" or "system." Furthermore, aspects of the present invention may take the form of a computer program product embodied in at least one computer readable medium(s) having computer readable program code embodied thereon.

Any combination of at least one computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire(s), a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible or non-signal medium that can contain or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments may be written in any combination of programming languages, including an object oriented programming language such as Java, Smalltalk, C++ or the like and conventional procedural programming languages, such as the "C" programming language or similar programming languages. The program code may execute entirely on a first computer, partly on the first computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider).

Embodiments are described with reference to figures of methods, apparatus (systems) and computer program products according to embodiments. It will be understood that portions of the figures can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for distributed sampling on a network with a plurality of sites and a coordinator, comprising:
receiving at the coordinator a data element from a site of the plurality of sites, said data element having a weight randomly associated therewith deemed reportable by comparison at the site to a locally stored global value;
comparing the weight of the data element received with a global value stored at the coordinator; and
performing one of:
updating the global value stored at the coordinator to the weight of the data element received; and
communicating the global value stored at the coordinator back to the site of the plurality of sites.

2. The method of claim 1, wherein the weight randomly associated with the data element at the site is deemed reportable by the site if the weight randomly associated with the data element is less than the locally stored global value at the site.

3. The method of claim 2, wherein the communicating the global value stored at the coordinator back to the site of the plurality of sites is performed responsive to a determination that the weight randomly associated with the data element received is greater than the global value stored at the coordinator.

4. The method of claim 3, wherein the updating the global value stored at the coordinator to the weight of the data element received is performed responsive to a determination that the weight randomly associated with the data element received is less than the global value stored at the coordinator.

5. The method of claim 1, wherein the weight randomly associated with the data element at the site is deemed reportable by the site if the weight randomly associated with the data element is greater than the locally stored global value.

6. The method of claim 5, wherein the communicating the global value stored at the coordinator back to the site of the plurality of sites is performed responsive to a determination that the weight randomly associated with the data element received less than the global value stored at the coordinator.

7. The method of claim 6, wherein the updating the global value stored at the coordinator to the weight of the data element received is performed responsive to a determination that the weight randomly associated with the data element received is greater than the global value stored at the coordinator.

8. The method of claim 1, further comprising:
at each site:
receiving a plurality of data elements from a data stream;
associating a random weight to each of the plurality of elements; and
responsive to a data element being associated with a random weight below the locally stored global value at a receiving site, sending the data element to the coordinator.

9. The method of claim 1, further comprising storing, at the coordinator, at least one received data element from the plurality of sites.

10. The method of claim 1, further comprising estimating a number of distinct elements using the global value stored at the coordinator.

11. The method of claim 1, further comprising:
receiving a query at the coordinator; and
answering said query using a random sample based on at least one data element stored at the coordinator.

12. The method of claim 1, wherein said plurality of sites are network routers, and further wherein said network routers are connected to said coordinator via at least one network connection.

13. A computer program product for distributed sampling on a network with a plurality of sites and a coordinator, comprising:
a computer readable storage medium having computer readable program code embodied therewith, the computer readable program code comprising:
computer readable program code configured to receive, at the coordinator, a data element from a site of the plurality of sites, said data element having a weight randomly associated therewith deemed reportable by comparison at the site to a locally stored global value;
computer readable program code configured to compare the weight of the data element received with a global value stored at the coordinator; and
computer readable program code configured to perform one of:
updating the global value stored at the coordinator to the weight of the data element received; and
communicating the global value stored at the coordinator back to the site of the plurality of sites.

14. The computer program product of claim 13, wherein the computer readable program code configured to communicate the global value stored at the coordinator back to the site of the plurality of sites is further configured to communicate the global value responsive to a determination that the weight randomly associated with the data element received is greater than the global value stored at the coordinator.

15. The computer program product of claim 14, wherein computer readable program code configured to update the global value stored at the coordinator to the weight of the data element received is further configured to update the global value stored at the coordinator responsive to a determination that the weight randomly associated with the data element received is less than the global value stored at the coordinator.

16. The computer program product of claim 13, wherein the computer readable program code configured to communicate the global value stored at the coordinator back to the site of the plurality of sites is further configured to communicate the global value responsive to a determination that the weight randomly associated with the data element received less than the global value stored at the coordinator.

17. The computer program product of claim 16, wherein the computer readable program code configured to update the global value stored at the coordinator to the weight of the data element received is further configured to update the global value at the coordinator responsive to a determination that the weight randomly associated with the data element received is greater than the global value stored at the coordinator.

18. The computer program product of claim 13, further comprising computer readable program code configured to:
store, at the coordinator, at least one received data element from the plurality of sites;
receive a query at the coordinator; and
answer said query using a random sample based on at least one data element stored at the coordinator.

19. The computer program product of claim 13, wherein said plurality of sites are network routers, and further wherein said network routers are connected to said coordinator via at least one network connection.

20. A system comprising:
at least one processor; and
a memory device operatively connected to the at least one processor;
wherein, responsive to execution of program instructions accessible to the at least one processor, the at least one processor is configured to:
receive at the coordinator a data element from a site of the plurality of sites, said data element having a weight randomly associated therewith deemed reportable by comparison at the site to a locally stored global value;
compare the weight of the data element received with a global value stored at the coordinator; and
perform one of:
updating the global value stored at the coordinator to the weight of the data element received; and
communicating the global value stored at the coordinator back to the site of the plurality of sites.

* * * * *